United States Patent
Mallinson et al.

(10) Patent No.: US 11,392,824 B2
(45) Date of Patent: Jul. 19, 2022

(54) SELF-CLOCKING MODULATOR AS ANALOG NEURON

(71) Applicant: SiliconIntervention Inc., Kelowna (CA)

(72) Inventors: A. Martin Mallinson, Kelowna (CA); Christian Leth Petersen, Burnaby (CA)

(73) Assignee: SiliconIntervention Inc., Kelowna (CA)

( * ) Notice: Subject to any disclaimer, the term of this patent is extended or adjusted under 35 U.S.C. 154(b) by 379 days.

(21) Appl. No.: 16/815,223

(22) Filed: Mar. 11, 2020

(65) Prior Publication Data

US 2020/0293871 A1 Sep. 17, 2020

Related U.S. Application Data

(60) Provisional application No. 62/817,395, filed on Mar. 12, 2019.

(51) Int. Cl.
*G06N 3/063* (2006.01)
*G06F 7/544* (2006.01)

(52) U.S. Cl.
CPC ......... *G06N 3/0635* (2013.01); *G06F 7/5443* (2013.01)

(58) Field of Classification Search
CPC .... G06N 3/0635; G06N 3/0481; G06N 3/063; G06F 7/5443
See application file for complete search history.

(56) References Cited

U.S. PATENT DOCUMENTS

| 5,075,869 A * | 12/1991 | Holler | G06N 3/0635 706/18 |
| 5,146,602 A * | 9/1992 | Holler | H01L 29/7887 708/801 |
| 2019/0081635 A1* | 3/2019 | Kurahashi | H03M 1/468 |
| 2019/0087717 A1* | 3/2019 | Manipatruni | G06N 3/063 |

OTHER PUBLICATIONS

"Wideband, High Gain Voltage Limiting Amplifier," Texas Instruments Incorporated, OPA699, SBOS261D, Nov. 2002—Revised Dec. 2008.

* cited by examiner

*Primary Examiner* — Ajay Ojha
(74) *Attorney, Agent, or Firm* — Gard & Kaslow LLP

(57) ABSTRACT

A self-clocking (or self-oscillating) modulator in signal processing, similar to a ΣΔ modulator, with particular application in the design of neural networks based on such modulators is described. A system of multiple self-clocking modulators and supporting structures may be configured to perform a calculation similar to that of an analog computer, such as a neural network, at lower power and smaller size than a digital implementation. Such a system constructed using the present approach does not require a sequential solution, but rather converges on a solution in one step; unlike the typical prior art, it thus requires no clock and operates asynchronously in a manner similar to a conventional analog computer. The self-clocking modulator can function as a neuron in a neural network, receiving a sum-of-products signal and generating an output stream like that of a ΣΔ modulator that represents this sum-of-products, potentially also including an activation function and offset.

12 Claims, 4 Drawing Sheets

SELF-CLOCKING MODULATOR AS ANALOG NEURON

This application claims priority from Provisional Application No. 62/817,395, filed Mar. 12, 2019, which is incorporated by reference herein in its entirety.

FIELD OF THE INVENTION

The present invention relates generally to sigma delta ($\Sigma\Delta$) modulators, and more particularly to the use of sigma delta modulators as self-clocking circuits.

BACKGROUND OF THE INVENTION

Digitals computers are configurable, and thus may be programmed, to perform neural network calculations. The ability to integrate thousands of multipliers and summers (collectively known as MACs for multipliers and accumulators) on a digital chip may enable a cost-effective implementation of voice recognition, handwriting analysis, etc.

Digital computers operate synchronously, i.e., the state variables of the digital computer progress from time to time under the control of a clock which is a digital signal shared by all elements of the computer to ensure that the state variables advance in a lock-step fashion.

Within this synchronous environment, algorithms executing on the state variables cause the creation of the desired output, commonly requiring multiple clock cycles to complete. Consequently, the digital computer typically progresses though a finite sequence of clock cycles to achieve the programmed objective as determined by the algorithm.

One of the most time consuming and difficult aspects of creating a digital computer is configuring the distribution of the clock signal to all of the components of the computer in which it is needed. Routing the clock to all of the elements of the digital computer that must remain in lock-step with each other consumes significant power. In the known art, such clock design is supported by tools created specifically for the purpose; for example, clock "trees" are used to keep time synchronization, clock "gating" is used to save power, and timing analysis after chip construction is a key step in the successful manufacturing of silicon chips requiring clock signals.

By contrast, analog computers operate asynchronously; the state variables of an analog computer are the voltages and currents in the network. An analog network having a configuration designed to provide a desired solution to a problem converges on a result determined by that configuration because the network is constrained by Kirchhoff's current law such that its only consistent state is an analog of the problem to be solved.

Within an analog computer there is typically no clock or anything that resembles a clock, nor are there any intermediate states that progress to the solution. The solution in an analog computer emerges in a single event; while the analog computer may have a transient response, that transient response is from the initial state to the final solution.

Neural networks are calculation paradigms. They are interesting because they can solve problems in an artificial intelligence (AI) like way. A neural network implementing AI can be trained, i.e., can be adjusted, such that the network solves a problem.

A neural network calculation paradigm may be coded into an algorithm executing on a digital computer, or may also be embedded in an analog computer. The analog computer implementation of the neural network typically has some advantages over the digital implementation, at least one of which is the absence of the clock. The analog implementation is also commonly faster and consumes less power.

However, the analog computer may not be able to be programmed conveniently. Further, some of the automated construction tools available for digital circuit design, such as the Verilog hardware description language and place and route tools, do not exist for analog computers.

It would desirable to be able to combine some aspects of an analog computer implementation, such as low power and the absence of a clock, with the programmability of a digital neural net.

SUMMARY OF THE INVENTION

The present application describes an apparatus using a self-clocking modulator as an analog neuron for use in a neural network.

One embodiment describes a neuron circuit for use in a neural network, comprising: a weighting circuit configured to receive a plurality of input signals and produce a sum-of-products signal by weighting each of the input signals and adding the weighted input signals together; and a self-clocking circuit configured to receive the sum-of-products signal and produce a quantized output signal representing the sum-of-products signal.

DETAILED DESCRIPTION OF THE INVENTION

Figure 1:
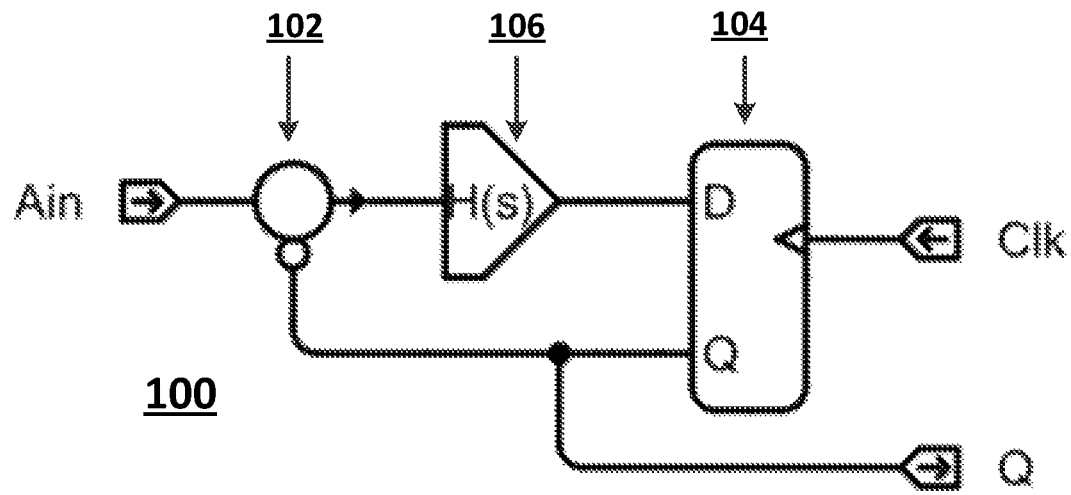
FIG. 1 is a diagram of a sigma delta modulator as is known in the prior art.

Described herein is the use of a self-clocking (or self-oscillating) modulator in signal processing, similar to a sigma delta ($\Sigma\Delta$) modulator, with particular application in the design of neural networks based on such modulators. A system of multiple self-clocking modulators and supporting structures can be configured to perform a calculation similar to that of an analog computer, such as a neural network, at lower power and smaller size than a digital implementation. Such a system constructed using the present approach does not require a sequential solution, but rather converges on a solution in one step; unlike the typical prior art, it thus requires no clock and operates asynchronously in a manner similar to a conventional analog computer. The description herein uses a neural network as an example, but the present approach is not restricted to such use cases.

In the present approach, the self-clocking modulator can function as a neuron in a neural network; it receives a sum-of-products signal and generates an output stream like that of a $\Sigma\Delta$ modulator that represents this sum-of-products, potentially also including an activation function and offset.

A ΣΔ modulator is characterized by a discrete set of output quantities expressed over as few as one bit, with a signal imposed upon the discrete outputs. ΣΔ modulators are sometimes called "noise-shaping" devices because the output sequence of discrete quantities may be thought of as having a noise added to the signal. The noise in this analysis is the quantity that must be added to the analog quantity to cause the output to occupy one of the discrete levels. (ΣΔ modulators are sometimes called delta-sigma (ΔΣ) modulators; in some places they may also be called delta (Δ) modulators, although in many places, such as the United States, a delta modulator is considered to have a somewhat different function.)

For example, a single bit ΣΔ modulator accepts a nominally continuous input that is within the range of −1 to 1 and outputs a quantized signal of two states that we may represent as either −1 or 1. The number of occurrences of −1 or 1 is such that the average of the outputs represents the value of the input signal. In this example, if the input signal is 0 then the output is:

−1 1 −1 1 −1 1

It will be seen that this is a sequence of quantized values having an average value equal to the input signal, i.e., 0. However, since there is no 0 output, "noise" of 1 or −1 is added to the input to produce each output value.

This "noise-shaping function" of a ΣΔ modulator may also be seen in another example. If the single bit ΣΔ modulator described above is used to encode an input of 0.5 the output sequence might be:

−1 1 1 1 −1 1 1 1 −1 1 1 1 etc.

It will be seen that this sequence has an average value of 0.5, i.e. ¾ of the range from −1 to 1, which is 0.5 and equal to the input. Again, "noise" has been added to this input in sequence, i.e., values of −1.5, 0.5, 0.5, 0.5 etc. are added in sequence to the input value of 0.5 to get the discrete output sequence from the ΣΔ modulator.

Considering a ΣΔ modulator in this way, i.e., as a device that adds noise to a continuous signal in such a way as to generate a sequence of discrete outputs), the frequency domain characteristics of the noise may be analyzed. Such analysis is known in the art.

Those of skill in the art generally refer to the "order" of the noise shape in the frequency domain. First order ΣΔ modulators, or "first order noise shapers," have a noise that rises 6 decibels (db) per octave (or equivalently 20 db per decade or order of magnitude). Second order noise shapers have regions of noise that rises at 12 db per octave, and so forth. Some forms of ΣΔ modulator have zeros in the noise, i.e., they have a spectrum of noise that nominally goes to zero at a specific frequency.

In addition to the quantization in amplitude required by the discrete output amplitudes of the ΣΔ modulator, there is also an implied quantization in time. The elements of the quantized output are changing at discrete and generally predictable times. In the prior art, as in typical digital systems the quantization in time of the ΣΔ modulator is achieved by the use of a clock signal, a digital event at a specific time, at which time the ΣΔ modulator makes the transitions between the discrete output levels.

One of skill in the art will appreciate that a system using ΣΔ modulators may have physically fewer interconnections, as a sigma delta encoded signal can be communicated with only one wire. Further, certain mathematical operations are convenient within the ΣΔ signal domain; specifically, multiplication requires few resources and summation may be easily achieved. These observations provide motivation to use a ΣΔ device as an element of a neural network.

In the prior art a ΣΔ modulator generally requires a clock. In the present approach, a ΣΔ modulator operates as a neuron in a digital neural net without a clock. The programmability of a digital neural net is preserved, the low power and smaller size of an analog neural net are achieved with a signal on a single wire, and no clock is required.

FIG. 1 is a diagram of a ΣΔ modulator 100 of the prior art. A differencing element 102 compares the input signal Ain to the quantized feedback signal from the Q output of a quantizer 104; quantizer 104 may, for example, be a D-type flip flop (DFF). The filter 106 operates on the output of differencing element 102 and drives the D input to quantizer 104.

Every clock edge provided by a clock signal Clk will cause quantizer 104 to update the Q output, to a high level if the input at D is high and to a low level if the input at D is low. Consequently, since filter 106 is generally an integrator with a 1/s characteristic as part of the transfer function, the average value of the Q output of quantizer 104 must equal input signal Ain.

Figure 2:
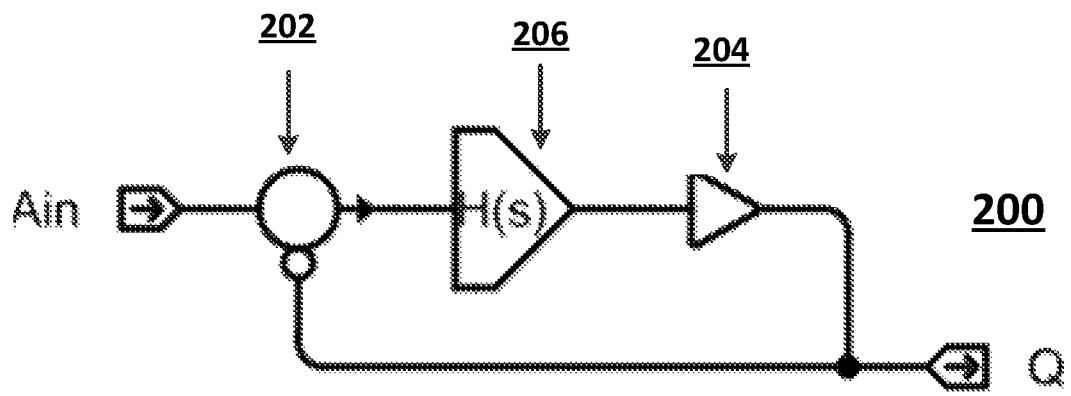
FIG. 2 is a diagram of a self-clocking modulator according to one embodiment.

FIG. 2 is a diagram of a self-clocking modulator 200 according to one embodiment of the present approach. Quantizer 104 of ΣΔ modulator 100 in FIG. 1 is replaced by an amplifier 204, which has a high gain but a limited output; for example, the Texas Instruments OPA699 Voltage Limiting Amplifier is believed to have these characteristics. In the present approach, amplifier 204 has a transfer characteristic similar to:

$$\text{Out}=\min(\max(\ln*G),1),-1) \qquad \text{(Equation 1)}$$

where G is much greater than 1. This indicates that although the amplifier 204 has high gain, the output Q of modulator 200 is limited to 1 and −1.

If filter 206 has a low pass characteristic, i.e., the gain remains finite at direct current (DC), but with insufficient phase margin to remain stable, then the system will oscillate, and the output Q will be observed to be either at −1 or 1 (the limits of Equation 1). Modulator 200 is thus essentially quantized due to the high gain, bouncing between the upper and lower limits of the power supply. However, because the differencing element 202 is driving the filter 206 with the difference between Q and Ain, modulator 200 has the same desirable characteristic of a ΣΔ modulator without an explicit clock. Specifically, the output Q is a sequence of discrete outputs one of −1 or 1, the timing of which is determined by the stability (or more accurately lack of stability) characteristic of the loop in modulator 200.

One of skill in the art will be aware of how the phase margin of a circuit determines its stability, as taught by, for example, the Bode stability criterion, and will be able to determine whether a given circuit of this type is stable or unstable.

Figure 3:
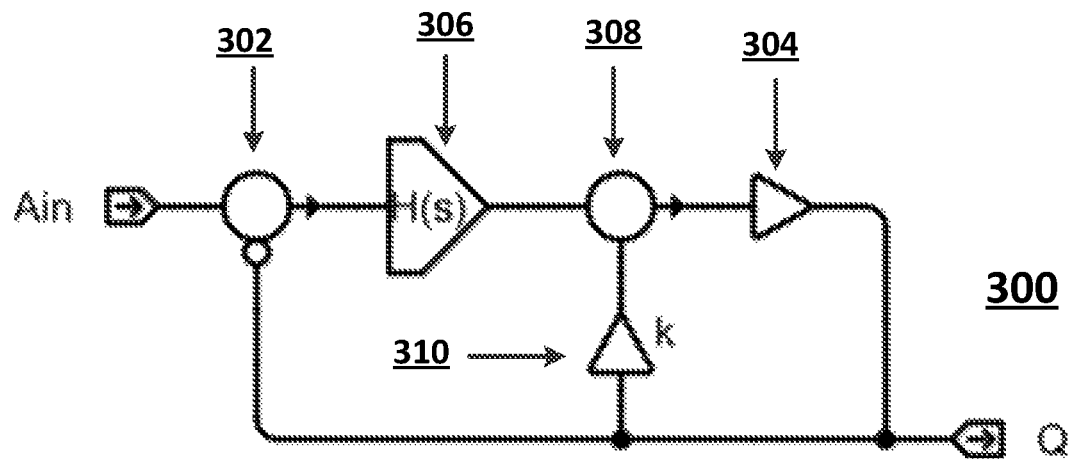
FIG. 3 is a diagram of a self-clocking modulator according to another embodiment.

FIG. 3 shows a self-clocking modulator 300 according to another embodiment of the present approach. In modulator 300, a lack of stability is caused not by the stability criteria of the loop, but by the presence of hysteresis around high gain amplifier 304.

As with modulator 200 of FIG. 2, modulator 300 has a differencing element 302 that compares the input signal Ain to the quantized feedback Q output, a low-pass filter 306 and a high gain amplifier 304. Now, however, there is an adder 308 that adds a Q-based component to the filtered differential output of differencing element 302. A second amplifier 310 in the loop provides the Q-based component to adder 308; amplifier 310 multiplies the Q output by a gain k.

The gain k of amplifier 310 is finite but small; for example, gain k might be as small as 0.0001. This is enough to prevent the loop from converging to a stable solution regardless of the phase margin, and thus the output Q will oscillate between the limits of 1 and −1 and once again create a ΣΔ modulator-like output sequence.

Note that in circuits 200 and 300 of FIGS. 2 and 3, the oscillations between the upper and lower limits, here 1 and −1, are not necessarily regular and are not tied to a particular frequency, but rather the circuits operate at a duty cycle that results in an average output value such that the input to filter 206 or 306, respectively, is 0. How much time the circuit spends at each output value is again dependent upon the input.

Figure 4:
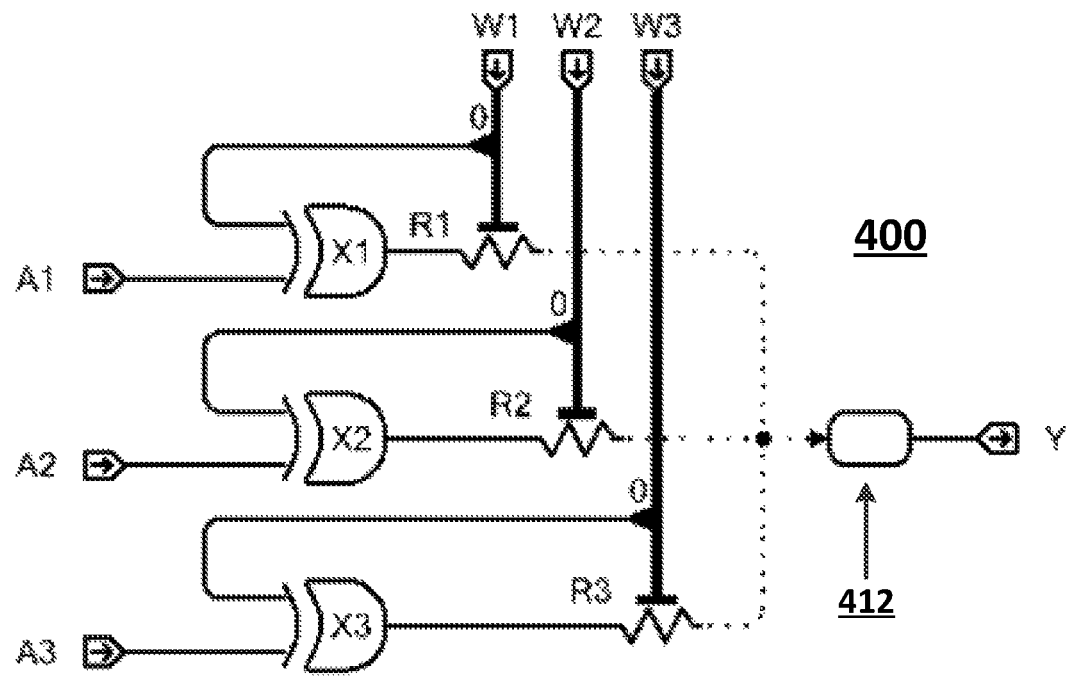
FIG. 4 is a diagram of a neuron that may be used in a neural network according to one embodiment.

FIG. 4 is a diagram of a neuron 400 that may be used in a neural network according to one embodiment of the present approach, showing how a self-clocking modulator may be used within a neural network. Neuron 400 includes a self-clocking modulator 412 as described above; for example, self-clocking modulator 412 may be circuit 200 of FIG. 2 or circuit 300 of FIG. 3, or some similar circuit such as those discussed elsewhere herein.

As with self-clocking modulators 200 and 300 of FIGS. 2 and 3, respectively, there is no clock. The output signal is discrete and expressible on a single wire, in contrast to digital systems which need more than one wire on which to express a digital quantity other than a single bit.

If a neuron is used as shown with analog addition of weighted signals, positive and negative quantities are easily represented. Three inputs A1, A2 and A3 are shown in FIG. 4 although any number of inputs Ai is possible; these are presumed to be digital values (possibly the result of a prior self-clocking circuit); in this context they are conceptually 1 or −1, and can be represented as −1 volt and +1 volt.

The impedance elements R1, R2 and R3 are adjustable impedances that provide weights to the values of inputs A1 to A3. In one embodiment, the values of the impedance elements R1 to R3 may be programmed by signals on the W1, W2 and W3 busses respectively. (For any number Ai of inputs, there will typically be an equal number Ri of impedances and Wi of control busses.)

In the illustrated embodiment, the least significant bit (LSB, or zeroth bit) of the bus is used to change the sign of input signals A1, A2 and A3 input into exclusive-or (XOR) gates X1, X2 and X3 when necessary, and the bits of the signals other than the LSB are used to change the impedance value. (Again, each input signal A1, A2 and A3 is presumably a 1 or −1; in some cases the weights to be applied to these inputs may be negative, thus requiring a change in sign.) The only analog signal in neuron 400 is the input to self-clocking modulator 412, which is the analog sum of products of the Ai and Wi signals.

The portion of circuit 400 including impedance elements R1, R2 and R3, XOR gates X1, X2 and X3, and the control busses W1, W2 and W3 (which may be generalized as Rn, Xn and Wn for some number n of input values) comprise a weighting circuit, as each input signal is given a weight by its associated resistor, and the weighted inputs then connect to a common point, i.e., are summed to become a sum-of-products signal, as is known in the art.

Figure 5:
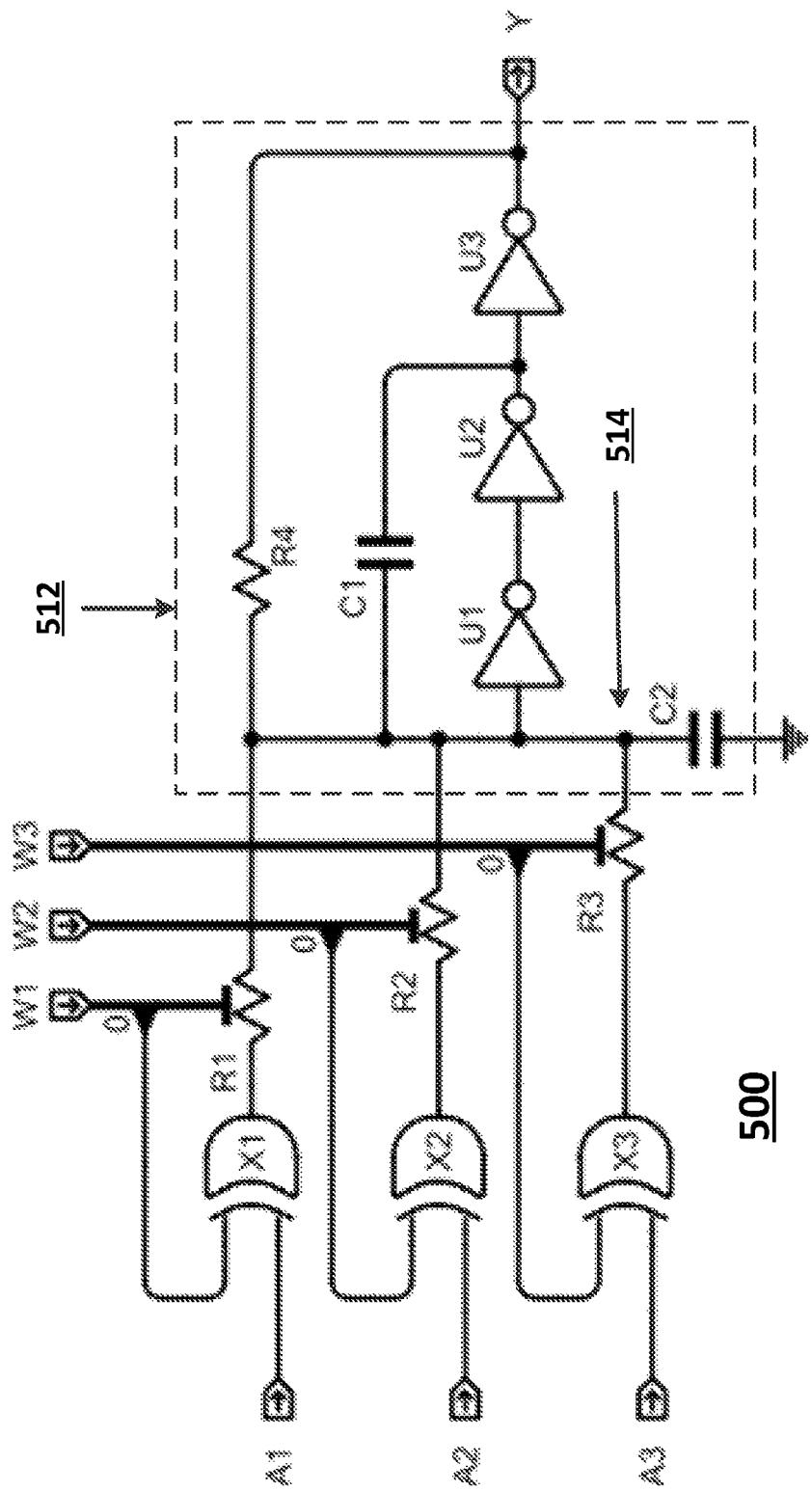
FIG. 5 is a diagram of a neuron that may be used in a neural network according to another embodiment.

FIG. 5 is a diagram of a neuron 500 that may be used in a neural network according to another embodiment. The self-clocking modulator portion 512 of neuron 500 now includes three inverters U1, U2 and U3, capacitors C1 and C2, and feedback resistor R4. The threshold voltage of inverter U1, i.e., the point where it switches output, defines the zero-voltage level. Nominally, this will be half of the power supply voltage. The first inverter U1 receives the sum-of-products signal from the weighting circuit portion of neuron 500, which again includes impedance elements R1, R2 and R3, XOR gates X1, X2 and X3, and the control busses W1, W2 and W3. The first inverter U1 also receives capacitive feedback from capacitor C1, resistive feedback from resistor R1, and capacitive grounding from capacitor C2. The second inverter U2 produces a second inverted signal, and the third inverter U3 produces the quantized output signal.

The capacitor C2 is the integrating capacitor in a first order ΣΔ modulator; one end of capacitor C2 is connected to all of the weighted inputs from resistors R1, R2 and R3 at point 514, and thus receives the sum of the weighted inputs. The other end of capacitor C2 is connected to a ground, so that it provides capacitive grounding.

The self-clocking modulator 512 is nearly unstable without feedback capacitor C1, but may not actually be unstable due to variability in the inverters. To insure instability, capacitor C1 provides positive capacitive feedback and hysteresis, pulling the input of inverter U1 high when the output of inverter U2 goes high, and thus insures instability.

Output signal Y is a digital signal suitable to apply to the inputs of the next neuron layer. Due to the resistive feedback through resistor R4, the average value of output signal Y keeps the value at point 514, which is also the input to inverter U1, near the threshold voltage of inverter U1.

Those skilled in the art in light of the teachings herein will note that if the power supply to inverter U1 is wired separately from the other inverters, that power supply will serve to adjust the threshold of the circuit, thus implementing an offset as is commonly required in a neural network. This may be regarded as a somewhat more practical implementation that uses a unipolar supply, the two logical levels being represented as for example, 0 volts and 1 volt. In this case the self-clocking modulator 402 in FIG. 5 may be modified to include an offset as shown in FIG. 6.

Figure 6:
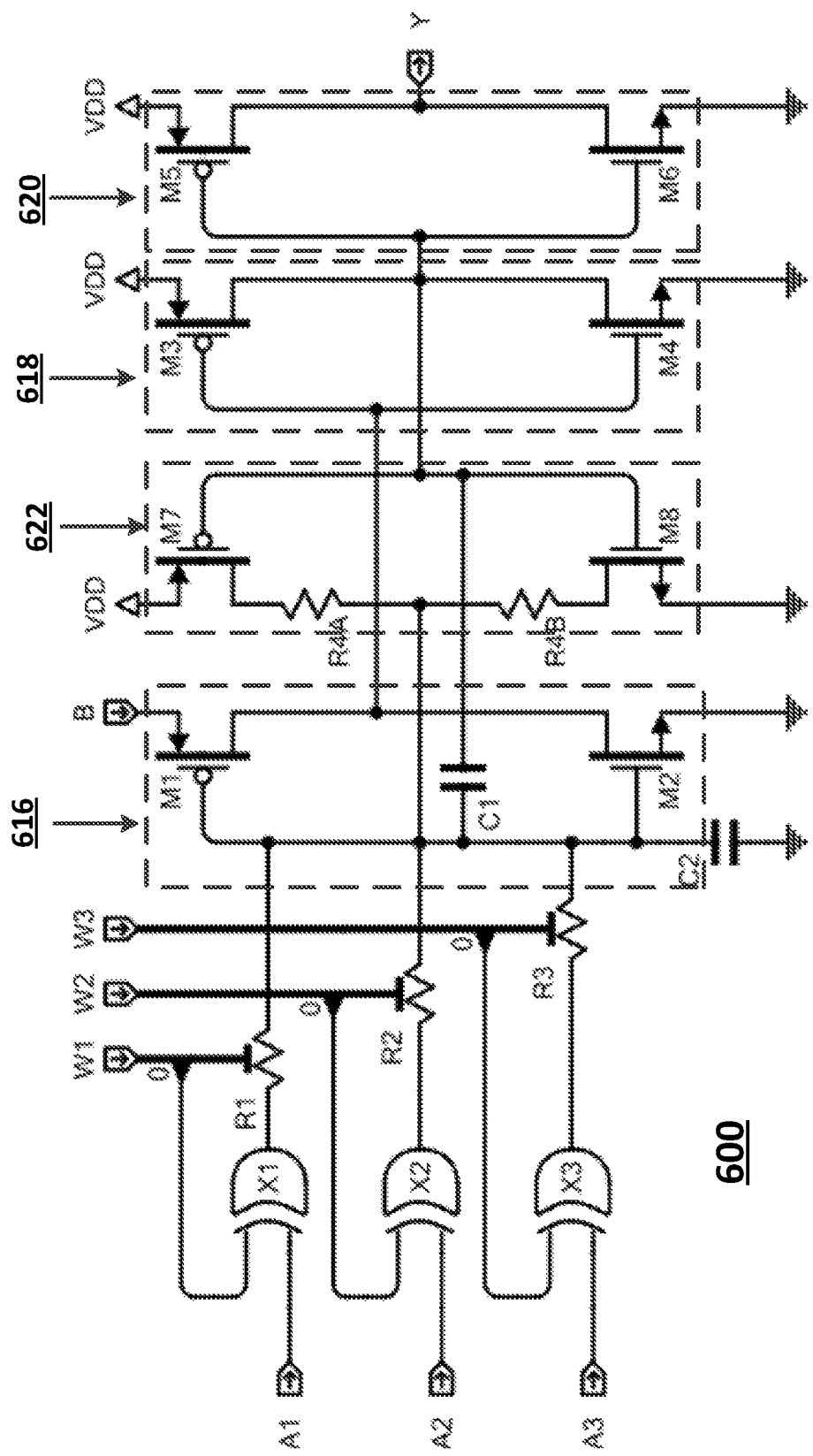
FIG. 6 is a schematic diagram of an implementation of a neuron similar to that shown in FIG. 5 according to one embodiment.

FIG. 6 is a schematic diagram of an implementation of a neuron 600 similar to neuron 500 shown in FIG. 5 according to one embodiment of the present approach. FIG. 6 shows a separate power supply B, which operates as an offset, provided to the first invertor 616 (U1 in circuit 500 of FIG. 5), formed by transistors M1 and M2. An offset is believed to aid the circuit in converging on a solution in AI applications. (An offset could be provided in other ways; for example, signal A3 and resistor R3 could be controlled to provide an offset, but such modification of an input signal and a weighting impedance to provide an offset is believed to be uncommon in AI applications.)

In neuron 600, transistors M3 and M4 form a second inverter 618 (equivalent to inverter U2 in FIG. 5), while transistors M5 and M6 form a third inverter 620 (equivalent to inverter U3 in FIG. 5). Capacitor C2 again receives the sum of the weighted input signals from XOR gates X1, X2 and X3. Feedback is again provided from the junction between second inverter 618 and third inverter 620 through capacitor C1.

Neuron 600 also shows how the activation function may be implemented. An activation circuit 622 contains transistors M7 and M8, and resistors R4A and R4B. In contrast to feedback resistor R4 in circuit 500 of FIG. 5, in neuron 600 the feedback is provided through resistors R4A and R4B. The junction between resistors R4A and R4B is connected to the sum-of-products signal and the input of first inverter 616, and the gates of transistors M7 and M8 are connected to the output of second inverter 618 and the input of third inverter 620.

If resistors R4A and R4B have the same value, they perform the same function as resistor R4 in FIG. 5. However, if resistors R4A and R4B are of different values, the feedback from transistor M7 can differ from the feedback from transistor M8; one can even provide positive feedback while the other provides negative feedback. Thus, resistors R4A and R4B can provide non-linear feedback and define a non-linear activation function for neuron 600 as needed for neuron 600 to function properly in AI applications.

As illustrated in FIG. 6, transistors M1, M3, M5 and M7 are P-type metal oxide semiconductor field effect transistors (P-type MOSFETs) and transistors M2, M4, M6 and M8 are N-type metal oxide semiconductor field effect transistors (N-type MOSFETs). One of skill in the art will appreciate that other arrangements and/or numbers of transistors may be used to achieve the same, or a similar, result as neuron 600.

It will be clear to those skilled in the art in light of the teachings herein that a circuit constructed according to the present approach, and particularly the embodiment shown in FIG. 6, may be rendered into cells suitable for use with an existing digital place and route system. This benefit is present because all the input and output signals are digital signals. The programmable resistor and associated exclusive-OR gate are potentially one layout cell, and the self-clocking modulator is another. The B voltage may be globally routed to a common voltage.

Alternatively, it will be obvious to those skilled in the art in light of the teachings herein that an AI compiler, corresponding to the known Verilog elaboration process or RAM compiler methodology, can be applied to this present approach such that any arbitrary Analog AI Neural Network can be created programmatically.

By combining these features, it is possible to construct a neural network according to the present approach that reduces both the number of components and the amount of power consumed. One of skill in the art will appreciate that a neural network of any complexity may be constructed according to these principles, and that other circuits may be similarly constructed.

The disclosed system has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than or in addition to those described above.

For example, as is well understood by those of skill in the art, various choices will be apparent to those of skill in the art. Further, the illustration of transistors and the associated feedback loops, resistors, etc., is exemplary; one of skill in the art will be able to select the appropriate number of transistors and related elements that is appropriate for a particular application.

These and other variations upon the embodiments are intended to be covered by the present disclosure, which is limited only by the appended claims.

What is claimed is:

1. A neuron circuit for use in a neural network, comprising:
a weighting circuit configured to receive a plurality of input signals and produce a sum-of-products signal by weighting each of the input signals and adding the weighted input signals together; and
a self-clocking circuit configured to receive the sum-of-products signal and produce a quantized output signal representing the sum-of-products signal, wherein the self-clocking circuit further comprises:
a differencing element configured to determine a difference between the sum-of-products signal and the quantized output signal;
a filter configured to filter the difference between the sum-of-products signal and the quantized output signal;
a high-gain amplifier configured to amplify the filtered difference between the sum-of-products signal and the quantized output signal, to thereby generate the quantized output signal.

2. A neuron circuit for use in a neural network, comprising:
a weighting circuit configured to receive a plurality of input signals and produce a sum-of-products signal by weighting each of the input signals and adding the weighted input signals together; and
a self-clocking circuit configured to receive the sum-of-products signal and produce a quantized output signal representing the sum-of-products signal, wherein the self-clocking circuit further comprises:
a differencing element configured to determine a difference between the sum-of-products signal and the quantized output signal;
a filter configured to filter the difference between the sum-of-products signal and the quantized output signal;
an adder configured to add the filtered difference between the sum-of-products signal and the quantized output signal to an amplified quantized output signal;
a first amplifier configured to amplify the sum of the filtered difference between the sum-of-products signal and the quantized output signal, to thereby generate the quantized output signal; and
a second amplifier configured to amplify the quantized output signal.

3. The neuron circuit of claim 2 wherein the first amplifier is a high gain, limited output amplifier.

4. A neuron circuit for use in a neural network, comprising:
a weighting circuit configured to receive a plurality of input signals and produce a sum-of-products signal by weighting each of the input signals and adding the weighted input signals together; and
a self-clocking circuit configured to receive the sum-of-products signal and produce a quantized output signal representing the sum-of-products signal, wherein the self-clocking circuit further comprises:
a first inverter configured to invert a sum of the sum-of-products signal, capacitive feedback, resistive feedback, and capacitive grounding, to thereby produce a first inverted signal;
a second inverter configured to invert the first inverted signal, to thereby produce a second inverted signal;
a first capacitor coupled at a first end to the second inverted signal and at a second end to the sum-of-products signal, to thereby generate the capacitive feedback;
a third inverter configured to invert the second inverted signal, to thereby generate the quantized output signal;
a resistor coupled at a first end to the quantized output signal and at a second end to the sum-of-products signal, to thereby generate the resistive feedback; and a second capacitor coupled at a first end to the sum-of-products signal and at a second end to a ground, to thereby generate the capacitive grounding.

5. A neuron circuit for use in a neural network, comprising:
   a weighting circuit configured to receive a plurality of input signals and produce a sum-of-products signal by weighting each of the input signals and adding the weighted input signals together; and
   a self-clocking circuit configured to receive the sum-of-products signal and produce a quantized output signal representing the sum-of-products signal, wherein the self-clocking circuit further comprises:
      a first inverter configured to invert a sum of the sum-of-products signal, capacitive feedback, resistive feedback, and capacitive grounding, to thereby produce a first inverted signal;
      a second inverter configured to invert the first inverted signal, to thereby produce a second inverted signal;
      a first capacitor coupled at a first end to the second inverted signal and at a second end to the sum-of-products signal, to thereby generate the capacitive feedback;
      a third inverter configured to invert the second inverted signal, to thereby to generate the quantized output signal;
      a second capacitor coupled at a first end to the sum-of-products signal and at a second end to a ground, to thereby generate the capacitive grounding; and
      an activation circuit comprising:
         a first transistor having a source connected to a power supply, a gate connected to the output port of the second inverter, and a drain;
         a first resistor having a first resistance having a first end connected to the drain of the first transistor and a second end connected to the input port of the first inverter;
         a second transistor having a source connected to a ground, a gate connected to the output port of the second inverter, and a drain; and
         a second resistor having a second resistance and having a first end connected to the drain of the second transistor and a second end connected to the input port of the first inverter,
         the activation circuit thereby causing the neuron circuit to have a non-linear activation function.

6. The neuron circuit of claim 5, wherein each of the first, second and third inverters comprise:
   a first transistor having a source connected to a power supply, a gate connected to the input port, and a drain connected to the output port; and
   a second transistor having a drain connected to the drain of the first transistor and the output port, a gate connected to the input port, and a source connected to a ground.

7. The neuron circuit of claim 6, wherein the first transistor of each inverter and the activation circuit is a P-type metal oxide semiconductor field effect transistor and the second transistor of each inverter and the activation circuit is an N-type metal oxide semiconductor field effect transistor.

8. The neuron circuit of claim 5, wherein the first inverter is connected to a first power supply and the second and third inverters and the activation circuit are connected to a second power supply.

9. A neuron circuit for use in a neural network, comprising:
   a weighting circuit configured to receive a plurality of input signals and produce a sum-of-products signal by weighting each of the input signals and adding the weighted input signals together; and
   a self-clocking circuit configured to receive the sum-of-products signal and produce a quantized output signal representing the sum-of-products signal, wherein the weighting circuit further comprises a plurality of impedance elements, each impedance element having a first end configured to receive a different one of the plurality of input signals and a second end, the second ends of the plurality of impedance elements being connected together.

10. The neuron circuit of claim 9, wherein each of the impedance elements has an impedance that is adjustable by a control signal.

11. The neuron circuit of claim 10, wherein the weighting circuit further comprises:
    a plurality of exclusive-or gates, each exclusive-or gate having a first input port configured to receive a different one of the plurality of input signals and a second input port configured to receive a control signal;
    a plurality of impedance elements, each impedance element having a first end connected to the output port of a different one of the exclusive-or gates and a second end, the second ends of the plurality of impedance elements being connected together.

12. The neuron circuit of claim 11 wherein the control signal instructs an exclusive-or gate to invert or not invert the input signal received at the first input port of the exclusive-or gate.

* * * * *